United States Patent [19]

Bauer

[11] 4,360,158

[45] Nov. 23, 1982

[54] WASHING ARRANGEMENT FOR WINDOWS OF POWER VEHICLES

[75] Inventor: Peter-Josef Bauer, Bühl, Fed. Rep. of Germany

[73] Assignee: Robert Bosch GmbH, Stuttgart, Fed. Rep. of Germany

[21] Appl. No.: 197,658

[22] Filed: Oct. 16, 1980

[30] Foreign Application Priority Data

Nov. 10, 1979 [DE] Fed. Rep. of Germany ....... 2945440

[51] Int. Cl.$^3$ .............................................. B60S 1/48
[52] U.S. Cl. ................................................ 239/284 R
[58] Field of Search .............. 239/284 R, 284 A, 362, 239/363; 137/829, 830, 835; 15/250.01, 250.02

[56] References Cited

FOREIGN PATENT DOCUMENTS 2360250 5/1975 Fed. Rep. of Germany ... 239/284 R
2450302 6/1976 Fed. Rep. of Germany ... 239/284 R

*Primary Examiner*—James B. Marbert
*Attorney, Agent, or Firm*—Michael J. Striker

[57] ABSTRACT

A washing arrangement for a window of a motor vehicle has a washing liquid supply element, a main conduit extending from the supply element, a plurality of transverse conduits each connected with a spraying nozzle, and a branching element connecting the main conduit with the transverse conduits. The branching element includes a branching member formed as a valve body of a check valve, and a flexible tubular member which closes ports on the outer surface of the valve body. The valve body is provided with a plurality of transverse openings which extend substantially parallel to each other and into each of which a respective one of the transverse conduits is open.

6 Claims, 5 Drawing Figures

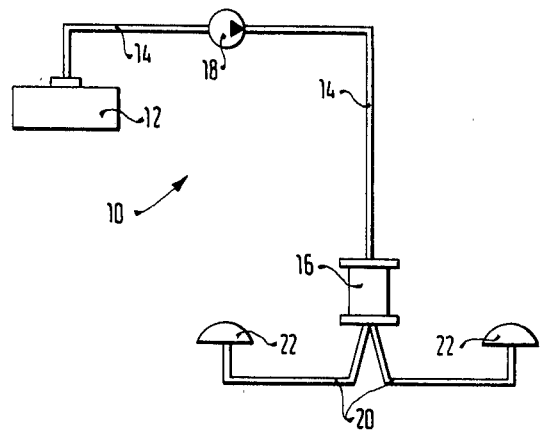
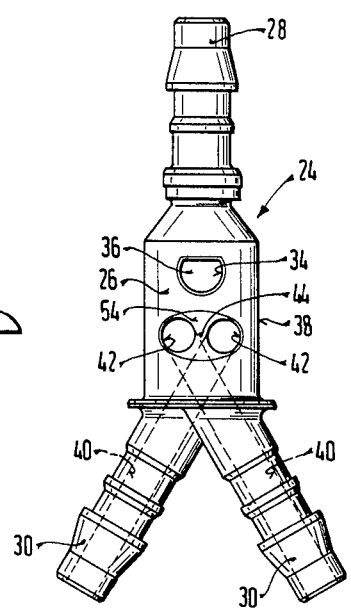
FIG. 1
FIG. 2
FIG. 3
FIG. 4
FIG. 5
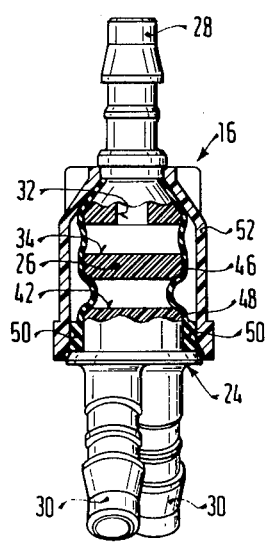
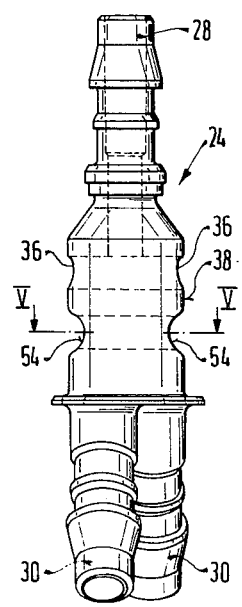
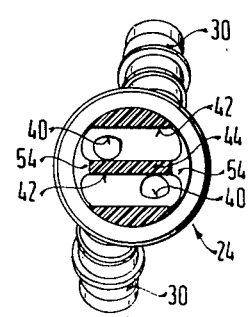

WASHING ARRANGEMENT FOR WINDOWS OF POWER VEHICLES

BACKGROUND OF THE INVENTION

The present invention relates to a washing arrangement for windows of motor vehicles.

Arrangements for washing windows of motor vehicles are known in the art. A known arrangement includes a check valve with a valve body onto which a flexible tubular member is fitted. The check valve guarantees that during the next washing step, the washing liquid is supplied to the window to be washed without delay. In the known arrangement the ports of the transverse openings provided in the valve body are arranged on the outer surface of the latter and spaced from one another by an angle of 180°. In certain conditions, for example in conditions of a non-uniform wall thickness of the flexible tubular member, the washing liquid can be pressed non-symmetrically between the flexible tubular member and the outer surface of the valve body. As a result of this, the washing liquid can flow only to one port of one transverse opening and then to a respective nozzle. This generates a pressure drop whereby the washing liquid does not immediately flow to the port of the other transverse opening and the nozzle of the latter does not work.

SUMMARY OF THE INVENTION

Accordingly, it is an object of the present invention to provide a washing arrangement which avoids the disadvantages of the prior art.

More particularly, it is an object of the present invention to provide a washing arrangement which guarantees that the ports of the transverse openings open simultaneously so that the nozzles which are connected with the transverse openings are simultaneously supplied with washing liquid.

In keeping with these objects and with others which will become apparent hereinafter, one feature of the present invention resides, briefly stated, in a washing arrangement including a washing liquid supply means, a main conduit extending from the supply means, a plurality of transverse conduits each connected with a spray nozzle, and a branching element connecting the main conduit with the transverse conduit and having a valve body and a flexible tubular member fitted on the valve body, whereby the valve body is provided with a plurality of transverse openings which extend substantially parallel to each other and into each of which a respective one of the transverse conduits is open.

When the washing arrangement is designed in accordance with the present invention, the ports of the transverse openings open simultaneously and the washing fluid is simultaneously supplied to both transverse openings and thereby to the nozzles connected with the same.

In accordance with another feature of the present invention, the two transverse openings are separated from one another by a web portion which is shorter than the length of the transverse openings, and the flexible tubular member abuts against the ends of the web portion with a prestress which is smaller than the prestress with which it abuts against the remaining portion of the valve body.

Still another feature of the present invention resides in that the valve body in the region of the ports of the transverse openings is provided with grooves.

A further feature of the present invention is that the flexible tubular member has at both its axial ends a portion which is thicker than the remaining portion of the same. The thicker end portions of the flexible tubular member are clamped against the outer surface of the valve body.

Finally, still a further feature of the present invention resides in that the transverse conduits are connected with connecting pipes which are provided on the valve body in a V-shaped arrangement.

The novel features of the present invention which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWINGS

FIG. 1 is a schematic view of a washing arrangement for a window of a motor vehicle, provided with a branching element formed as a check valve;

FIG. 2 is a plan view of the valve body of the branching element;

FIG. 3 is a view showing a partial section of the branching element in assembled condition;

FIG. 4 is a side view of the branching element; and

FIG. 5 is a section of the branching element taken along the line V—V in FIG. 4.

DESCRIPTION OF A PREFERRED EMBODIMENT

An arrangement for washing a window of a motor vehicle is identified in toto in FIG. 1 by reference numeral 10. It has a supply container 12 with a washing liquid and a main conduit 14 connected with the supply container 12. The main conduit 14 leads from the supply container 12 to a branching element 16. A supply pump 18 is provided in the main conduit 14.

Two transverse or nozzle conduits 20 are connected with the branching element 16. The transverse conduits 20 connect the main conduit 14 with two spraying nozzles 22. The ports of the spraying nozzles 22 are arranged so that they face towards one window or each of the spraying nozzles 22 faces towards a respective one of the windows to be washed. The windows of the vehicle are not shown in the drawing.

As can be seen from FIG. 3, the branching element 16 has a body 24 with a central portion 26 which is formed as a valve body of a check valve. The branching element body 24 has a connecting pipe 28 for connecting the same with the main conduit 14. The branching element body 24 further has connecting pipes 30 which serve for connection with the transverse conduits 20.

The openings 32 in the connecting pipe 28 belong to the main conduit 14 and opens into a transverse opening 34 in the portion 26 of the branching element body 24. The main conduit 14 has two ports 36 on an outer surface 38 of the valve body 26. Openings 40 of both connecting pipes 30 open in associated transverse openings 42 in the valve body or the portion 26 of the branching element body 24. The transverse openings 42 together with the openings 40 form communications to the transverse or nozzle conduits 20 which also open at the outer surface of the portion 26 of the branching element body 24.

As can be particularly seen from FIGS. 3, 4 and 5, both connecting pipes 30 are located opposite to one another, as seen relative to the longitudinal axis of the branching element body 24. They extend in V-shaped manner. Both transverse openings 42 extend substantially parallel to one another and are separated from one another by a web portion 44 which can be clearly seen from FIGS. 2 and 4. FIG. 3 shows that the portion 26 of the branching element body 24 is surrounded by a tubular member 46 which is constituted of an elastic material, preferably rubber. The tubular member 46 abuts against the outer surface of the portion 26 with prestress.

The ends 48 of the tubular member are provided with thicker portions 50. A cap 52 engages with the branching element body 24 and outwardly abuts against the thicker portions 50 of the tubular member. Thereby, the tubular member 46 is clamped in both its end regions against the branching element body 24, whereas the central region of the tubular member 46 abuts with prestress against the outer surface 38 of the portion 26.

The portion 26 of the branching element body 24 has through-shaped grooves 54 in the region of the ports of the transverse openings 42. Thereby, the web portion 44 which remains between both neighboring transverse openings 42 is shorter than the length of the transverse openings 42. The depth of the grooves 54 and the construction of the inner wall of the tubular member 46 are so determined relative to one another, that the tubular member 46 abuts against the ends of the web portion 44 with a reduced prestress. However, the prestress at the ends of the web portion 44 must be so strong that the transverse openings 42 are sealed from one another when the washing arrangement 10 is not in operation.

When the washing arrangement starts to operate, the pump 18 supplies washing liquid from the supply container 12 via the main conduit 14 to the branching element 16. The washing liquid flows through the openings 32 into the transverse openings 34 and leaves the tubular member in the region of the portion 26 from the outer surface 38 of the portion 26. The washing liquid flows now between the outer surface 38 and the inner wall of the tubular member 46 to the transverse openings 42. It flows to the grooves 52 in which region the prestress of the tubular member 46 is reduced. Thereby, this tubular member portion lifts with an impact from the ends of the web portion 44 and the washing liquid can flow into both openings 40 of the connecting pipe 30 and from there can flow via the transverse conduit 20 to the nozzles 22. It is thereby guaranteed that both nozzles always work simultaneously.

When the pump is turned off, the pressure in the supply system decreases and the tubular member 46 again completely abuts against the outer surface 38 of the portion 26. This is also true for the region of the tubular member 46, which closes the transverse openings 42. It presses against, but with reduced force, the ends of the web portion 44, so that both transverse openings 42 are blocked relative to one another. Because of the arrangement of the check valves 26, 46 it is eliminated that, for example during parking of the power vehicle in inclined position, both transverse conduits run empty. During the next washing step, the washing fluid is supplied to the window without delay.

It will be understood that each of the elements described above, or two or more together, may also find a useful application in other types of constructions differing from the types described above.

While the invention has been illustrated and described as embodied in an arrangement for washing windows of motor vehicles, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A washing arrangement for a window of a motor vehicle, comprising a washing liquid supply means; a main conduit extending from said supply means; a plurality of transverse conduits each connected with a spraying nozzle; and a branching element connecting said main conduit with said transverse conduits, said branching element including a branching member formed as a valve body of a check valve, said valve body having an axis and an outer surface provided with ports into which said main conduit and said transverse conduits are open, said branching element further including a flexible tubular member which closes said ports and is fitted onto said valve body with prestress, said valve body being provided with a plurality of transverse openings which extend substantially parallel to each other and into each of which a respective one of said transverse conduits is open, said plurality of transverse openings including at least two transverse openings separated from one another by a web portion, each of said two transverse openings having a predetermined length and two of said ports spaced from one another in the transverse direction, said valve body having a groove provided in the region of each port of said two transverse openings and said web portion, so that said web portion has a length which is smaller than the length of said two transverse openings, said web portion having two ends spaced from one another in a transverse direction, and said flexible tubular member abutting against said ends of said web portion with a prestress which is smaller than that with which said flexible tubular member abuts against the remaining portion of said valve body.

2. A washing arrangement as defined in claim 1, wherein said flexible tubular member has two end portions which are spaced from one another in an axial direction and thicker than the remaining portion of said flexible tubular member.

3. A washing arrangement as defined in claim 2, wherein said thicker end portions of said flexible tubular member are clamped against said outer surface of said valve body; and further comprising means for clamping said thicker end portions of said flexible tubular member on said outer surface of said valve body.

4. A washing arrangement as defined in claim 3, wherein said clamping means includes a cap which is fitted on said flexible tubular member so as to clamp said thicker portions of the latter against said outer surface of said valve body.

5. A washing arrangement as defined in claim 1, wherein said valve body is provided with a plurality of connecting pipes each connected with a respective one of said transverse conduits.

6. A washing arrangement as defined in claim 5, wherein said plurality of connecting pipes includes two connecting pipes which are arranged V-shaped on said valve body.

* * * * *